United States Patent Office 3,139,427
Patented June 30, 1964

3,139,427
17α,21-SUBSTITUTED METHYLENEDIOXY
PREGNADIENES
Milton Heller and Seymour Bernstein, New City, N.Y.,
assignors to American Cyanamid Company, Stamford,
Conn., a corporation of Maine
No Drawing. Filed Dec. 19, 1962, Ser. No. 245,684
4 Claims. (Cl. 260—239.55)

This invention relates to new steroid compounds. More particularly, it relates to 17α,21-substituted methylenedioxy steroids of the pregnane series.

The novel steroids of the present invention can be illustrated by the following structural formula:

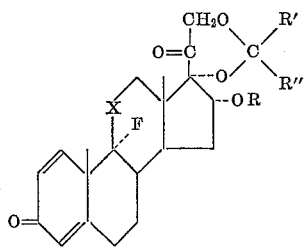

wherein R is selected from the group consisting of hydrogen and lower alkanoyl, R' and R'' is selected from the group consisting of hydrogen and lower alkyl, one of which is lower alkyl and X is selected from the group consisting of

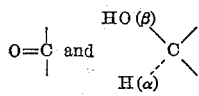

radicals.

The compounds of the present invention are, in general, crystalline solids and are insoluble in water. They are crystallizable from organic solvents such as toluene, benzene, petroleum ether and the like or mixtures of organic solvents such as benzene-toluene, acetone-petroleum ether or acetone-benzene.

The present compounds are prepared by reacting a 17α,21-dihydroxy steroid of the pregnane series with a dialkoxyalkane in the presence of dimethylformamide and p-toluenesulfonic acid. The reaction can be carried out at a temperature within the range of about 60° to 150° C. It is usually convenient and desirable to carry out the reaction at the refluxing temperature of the solvent used. The reaction is complete in a period of from about 5 hours to several days depending on temperature used.

In carrying out the present process the dialkoxyalkanes (having alkoxy groups on same carbon atom) can be, for example, dimethoxypropane, diethoxypropane, dimethoxybutane, diethoxybutane, dimethoxypentane, diethoxypentane, dimethoxyhexane, diethoxyhexane and the like.

The present compounds are physiologically active as anti-inflammatory agents and are useful as components of preparations for treating dermatological and opthalmic disorders.

The following examples show in detail the preparation of representative 17α,21-substituted methylenedioxy steroids of the pregnane series.

EXAMPLE I

Preparation of 16α-Acetoxy-9α-Fluoro-11β-Hydroxy-17α, 21-Isopropylidenedioxypregna-14-Diene-3,20-Dione A solution of 16α-acetoxy-9α-fluoro-11β,17α,21-trihydroxypregna - 1,4 - diene - 3,20 - dione (2.29 g.) [J. Am. Chem. Soc., 82, 4625 (1960)] and p-toluenesulfonic acid monohydrate (55 mg.) in 2,2-dimethoxypropane (34 ml.) and dimethylformamide (11.5 ml.) is refluxed for 96 hours. The reaction mixture still gives a positive but weak Blue Tetrazolium test. Solid sodium bicarbonate is added to the solution and most of the liquid is removed in a stream of air at 90° C. Water and ethyl acetate are added to the residue and after separation the water layer is further extracted with ethyl acetate. The combined ethyl acetate solutions are dried and the solvent removed under reduced pressure. The resultant uncrystallizable oil (2.86 g.) is submitted to chromatography on a magnesium silicate column (200 g.). Elution with acetone-petroleum ether (60–70° C.) (6:19) gives a solid 16α-acetoxy-9α-fluoro-11β-hydroxy-17α,21-isopropylidenedioxypregna-1,4 - diene - 3,20 - dione which upon crystallization from acetone-petroleum ether gives melting point 285.5–286° C.

EXAMPLE II

Preparation of 9α-Fluoro-11β,16α-Dihydroxy-17α,21-Iso-Propylidenedioxypregna-1,4-Diene-3,20-Dione A solution of 0.5 g. of 16α-acetoxy-9α-fluoro-11β-hydroxy-17α,21-isopropylidenedioxypregna-1,4-diene - 3,20-dione in 50 ml. of methanol and 10 ml. of 10% potassium carbonate solution is allowed to stand 20 minutes under nitrogen. The solution is then neutralized with acetic acid and is concentrated at room temperature. The addition of water gives 9α-fluoro-11β,16α-dihydroxy-17α, 21-isopropylidenedioxypregna-1,4-diene - 3,20 - dione as a precipitate which is collected.

EXAMPLE III

Preparation of 16α-Acetoxy-9α-Fluoro-17α,21-Isopropylidenedioxypregna-1,4-Diene-3,11,20-Trione A solution of 0.5 g. of 16α-acetoxy-9α-fluoro-11β-hydroxy-17α,21-isopropylidenedioxypregna-1,4-diene - 3,20-dione in 5 ml. of pyridine is added to a slurry 0.5 g. of chromium trioxide in 5 ml. of pyridine. After standing at room temperature 16 hours, the mixture is poured into water and is filtered. The filtrate is extracted with ethyl acetate and the solution is dried. Removal of the solvent under reduced pressure gives a solid which is 16α-acetoxy-9α-fluoro-17α,21-isopropylidenedioxypregna - 1,4-diene-3,11,20-trione.

We claim:
1. A compound of the formula:

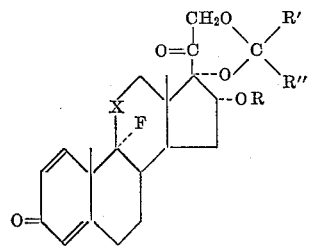

wherein R is selected from the group consisting of hydrogen and lower alkanoyl, R' and R" are lower alkyl and X is selected from the group consisting of

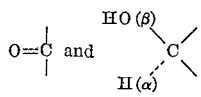

radicals.

2. The compound 16α-acetoxy-9α-fluoro-11β-hydroxy-17α,21-isopropylidenedioxypregna-1,4-diene-3,20-dione.

3. The compound 16α-acetoxy-9α-fluoro-17α,21-isopropylidenedioxypregna-1,4-diene-3,11,20-trione.

4. The compound 9α-fluoro-11β,16α-dihydroxy-17α,21-isopropylidenedioxypregna-1,4-diene-3,20-dione.

References Cited in the file of this patent

UNITED STATES PATENTS 3,081,299    Robinson et al. _____ Mar. 21, 1963

OTHER REFERENCES

Tanabe et al.: J.A.C.S., 83, pp. 756–57 (1961).